United States Patent
Puranen (12)

(10) Patent No.: US 6,470,931 B2
(45) Date of Patent: Oct. 29, 2002

(54) VENEER LATHE KNIFE ASSEMBLY

(75) Inventor: Jussi Puranen, Lahti (FI)

(73) Assignee: Raute OYJ, Nastola (FI)

( * ) Notice: Subject to any disclaimer, the term of this patent is extended or adjusted under 35 U.S.C. 154(b) by 0 days.

(21) Appl. No.: 09/987,033

(22) Filed: Nov. 13, 2001

(65) Prior Publication Data

US 2002/0056490 A1 May 16, 2002

(30) Foreign Application Priority Data

Nov. 13, 2000 (FI) .................................................. 002480

(51) Int. Cl.⁷ .......................... B23Q 16/00; B27K 1/00; B27M 1/00; B27L 5/02
(52) U.S. Cl. ..................... 144/356; 144/209.1; 144/212; 144/364; 144/380; 144/211; 83/171
(58) Field of Search ................ 83/170, 171; 144/209.1, 144/212, 213, 356, 357, 363, 364, 365, 380, 175, 382, 211

(56) References Cited

U.S. PATENT DOCUMENTS

| 3,265,103 A | 8/1966 | Hervey |
| 3,441,069 A | 4/1969 | Koss |
| 3,866,642 A | 2/1975 | Walser |
| 4,222,421 A | 9/1980 | Walser et al. |
| 4,893,663 A | 1/1990 | Ely |
| 5,630,454 A | 5/1997 | Koike |

FOREIGN PATENT DOCUMENTS

FI 86390 5/1992

OTHER PUBLICATIONS

A. O. fiehl, Reducing Heat Distortion in the Knife and Pressure Bar Assemblies of Veneer Lathes, Ottawa Laboratory Forest Products Laboratories of Canada, Jul. 1958, pp. 216–218.*

* cited by examiner

Primary Examiner—W. Donald Bray
(74) Attorney, Agent, or Firm—Connolly Bove Lodge & Hutz LLP; Larry J. Hume

(57) ABSTRACT

A veneer lathe knife assembly includes a lower portion supporting a veneer cutting knife, and a upper portion supporting a backing nose bar. The upper portion includes adjustment screws, for example, for adjusting a position of the nose bar in the upper portion of the assembly. To perform a fine adjustment of the knife gap formed between the cutting knife and the nose bar, the adjustment screws are individually temperature controlled to compensate for a thermal expansion of the adjustment screws, thus maintaining the knife gap along the length of the knife assembly.

16 Claims, 1 Drawing Sheet

VENEER LATHE KNIFE ASSEMBLY

The invention relates to a knife assembly for a veneer lathe. In particular, the invention relates to means for adjusting the gap between the cutting knife and the backing nose bar, known in the art as the knife gap, especially in a local manner at one or more selected points along the length of the knife/nose bar. The knife gap adjustment implemented by the means according to the invention can be appreciated as fine adjustment that as necessary either complements or compensates for the basic adjustment performed using the conventional adjustment means of the veneer lathe.

The knife assembly according to the invention comprises the conventional structures of a knife assembly, namely, a lower portion supporting the cutting knife and a upper portion supporting the nose bar, whereby the upper portion also includes screw means or the like for adjusting the position of the nose bar in the supporting upper portion. According to the invention, the screw means are equipped with means for controlling the temperature of the screw means.

The temperature control of the adjustment screw means serves to affect the longitudinal thermal expansion of the screw means and, thus, to provide means for a fine adjustment of the length of the screw.

Figure 1:
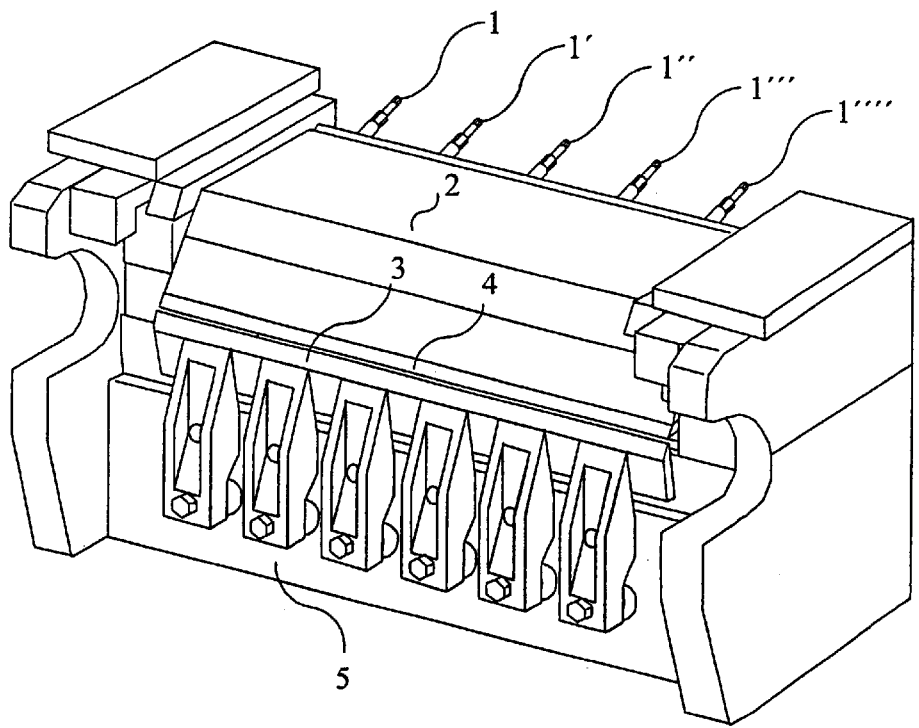
Figure 2:
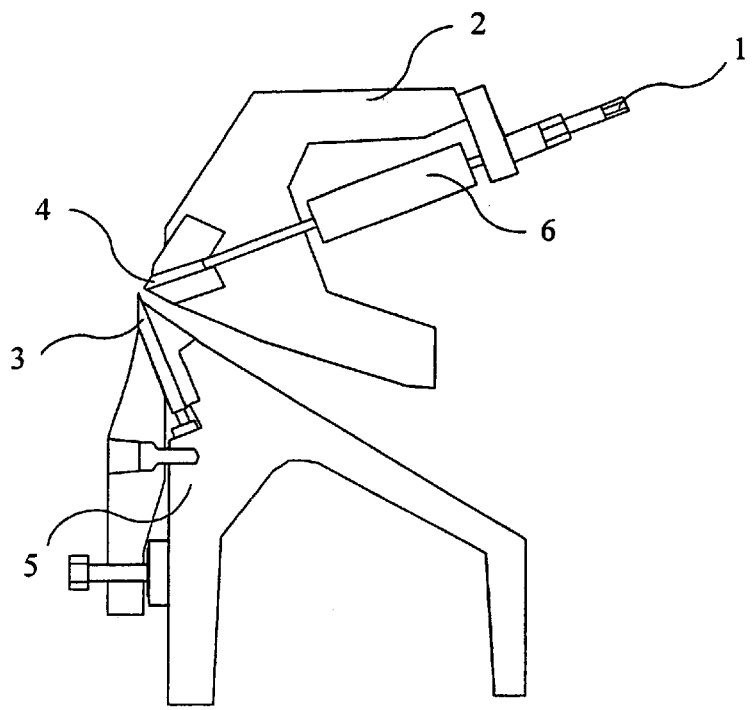

Next, the invention will be examined in greater detail with the help of the attached drawings, wherein FIG. 1 shows in a perspective view a conventional construction of a veneer lathe knife assembly, and FIG. 2 shows a cross section of the knife assembly.

Referring to the figure, a knife assembly shown therein is located in a conventional manner between opposed end pieces that serve to support the knife assembly on a knife carriage. The function of the knife carriage is provide the movements of the knife assembly and its positioning relative to the log being peeled.

The knife assembly comprises a upper portion 2 and a lower portion 5 that are implemented as beam-like structures extending over the entire length of the veneer lathe. The knife 3 proper for peeling veneer from the log is mounted on the lower portion 5 of the knife assembly by conventional fixing means. The upper portion of the knife assembly supports a so-called nose bar 4 that may be a sliding insert as shown in the diagrams or a roll rotating on the log. The function of the nose bar is to press the surface of the log being peeled at a point just preceding the peeling point of the veneer. The gap formed between the cutting knife 3 and the nose bar 4 is extremely crucial to the quality of veneer being peeled. Above all, this knife gap should have a correct width at all points of the knife length.

The position of the nose bar 4 in the upper portion 2 of the knife assembly, and, hence, the width of the knife gap is set in a conventional manner by different kinds of adjustment means such as the screw means 1—1'' shown in the diagram. Typically, these adjustment means are located at a spacing of about 200 mm along the knife assembly and they serve to adjust the knife gap of the veneer lathe to a desired set value over the entire length of the knife/nose bar. Additionally, some other factors must be taken into account during the operation of the veneer lathe that change the ambient conditions of the lathe from those prevailing during the initial adjustment of the knife gap. One of such important factors is heat build-up in the components of the lathe, particularly the temperature differentials between the components of the lathe. These thermal expansion effects tend to alter the set values of the knife gap. While the changes in the knife gap are not very large, they have been found to affect the quality consistency of the veneer leaving the lathe station; for instance, how well the veneer thickness profile stays uniform over of the width of the veneer sheet.

The arrangement according to the invention offers a viable possibility of controlling the knife gap during the operation of the veneer lathe, either based on feedback from the veneer profile or from observations made on the knife gap and its width profile in conjunction with a log change.

An embodiment of invention is illustrated in greater detail in FIG. 2. The adjustment screws located in the upper portion 2 of the knife assembly are equipped with elements 6 capable of controlling the temperature of the adjustment screws. These elements may be heating elements or, alternatively, cooling elements. Generally, an electrical heater as the heating element. Alternatively, the cooling or heating of a screw can be implemented, e.g., by means of a medium circulated in a shell surrounding the screw or using other heating/cooling means known in the art.

The thermal expansion coefficient of the knife gap adjustment screw is in the order of 0.000012 per one degree Celsius in the temperature of the screw. Assuming the screw to be 150 mm long, a temperature rise of 30 degree of Celsius causes an elongation of 0.054 mm in the length of the screw. This magnitude of elongation gives a well detectable change in the peeling quality.

Advantageously, the temperature control of the adjustment screws is implemented separately for each adjustment screw of the veneer lathe thus permitting the screw temperatures to be controlled individually at different points across the veneer lathe, whereby the control is based on, e.g., measurement data acquired from the veneer quality.

What is claimed is:

1. A veneer lathe knife assembly, comprising:
   a lower portion supporting a veneer cutting knife, and
   an upper portion supporting a nose bar,
   said upper portion including adjustment means for positioning the nose bar in the upper portion,
   wherein said adjustment means include means for controlling a temperature of the adjustment means.

2. The knife assembly according to claim 1, wherein said means for controlling a temperature include heating elements.

3. The knife assembly according to claim 1, wherein said means for controlling a temperature include cooling elements.

4. The knife assembly according to claim 1, further comprising means for receiving a control signal related to a measured thickness of a peeled veneer sheet for controlling a temperature of the adjustment means.

5. The knife assembly according to claim 2, further comprising means for receiving a control signal related to a measured thickness of a peeled veneer sheet for controlling a temperature of the adjustment means.

6. The knife assembly according to claim 3, further comprising means for receiving a control signal related to a measured thickness of a peeled veneer sheet for controlling a temperature of the adjustment means.

7. The knife assembly according to claim 1, wherein said adjustment means includes adjustment screws.

8. The knife assembly according to claim 7, wherein said adjustment screws are arranged across a length of the veneer lathe knife assembly.

9. The knife assembly according to claim 1, wherein said means for controlling a temperature of the adjustment means comprises a temperature-controlled medium provided in thermal communication with the adjustment means.

10. The knife assembly according to claim 1, wherein said means for controlling a temperature of the adjustment means comprises an electric heater.

11. A veneer lathe knife assembly, comprising:

a cutting element;

a nose bar arranged opposing the cutting element;

a plurality of adjustment screws coupled to the nose bar, said plurality of adjustment screws being arranged to control a knife gap between the cutting element and the nose bar; and means for controlling a thermal expansion of the plurality of adjustment screws in a direction perpendicular to the cutting element.

12. The knife assembly according to claim 11, wherein said means for controlling a thermal expansion of the plurality of adjustment screws comprises at least one temperature control element selected from the group consisting of a heater element and a cooling element.

13. The knife assembly according to claim 11, wherein said means for controlling a thermal expansion of the plurality of adjustment screws individually controls the thermal expansion of each of the plurality of adjustment screws.

14. The knife assembly according to claim 11, firmer comprising a shell surrounding the plurality of adjustment screws, wherein said shell contains a temperature controlled medium.

15. A method for providing a uniform thickness of a veneer produced by the veneer lathe knife assembly of claim 1, the method comprising:

observing a knife gap along a length of the knife assembly, controlling the temperature of the adjustment means; and adjusting the knife gap along the length of the knife assembly using the controlled temperature of the adjustment means.

16. A method for controlling a quality of a veneer produced by a veneer lathe knife assembly, the method comprising:

observing a knife gap along a length of the knife assembly;

controlling a temperature of each of a plurality of adjustment screws arranged to establish the knife gap, wherein the knife gap is adjusted along the length of the knife assembly and the quality of the veneer is controlled by said step of controlling the temperature.

* * * * *